June 25, 1963     H. MEYER     3,095,261

METHOD FOR MAKING HOLLOW BODIES FROM PLASTIC MATERIAL

Filed May 18, 1960

*INVENTOR.*
HORST MEYER

United States Patent Office 3,095,261
Patented June 25, 1963

3,095,261
METHOD FOR MAKING HOLLOW BODIES
FROM PLASTIC MATERIAL
Horst Meyer, Sachsenstrasse 28, Radebeul I, Germany
Filed May 18, 1960, Ser. No. 29,850
Claims priority, application Germany June 9, 1959
2 Claims. (Cl. 18—59)

The present invention relates to a method of making hollow bodies made of plastic materials.

It is already known to make balls in which a gel-forming mass is placed into one half of a mold whereupon hardening of the mass is performed in a special oven. However, it is a shortcoming of the balls so produced that they have a dull and rough outer surface. In order to obtain a lustrous surface, the balls have to be coated with lacquer and, in case it was desired to make balls with designs thereon, they have to be sprayed with the aid of patterns or templates. The designs so produced have the tendency to wear off rapidly and finally to disappear after a short while.

It is another inconvenience of balls so produced that a high percentage of waste occurs during the manufacture due to air occlusions which lead to leakage at the surface of the balls.

It is an object of the invention to improve the method of making hollow bodies, e.g. balls by hardening a plastic mass by providing means which permit to overcome the disadvantages of the known methods.

It is another object of the invention to provide a method whereby hollow articles can be made with designs thereon which are permanently affixed to the article and will not wear off during use.

It is a further object of the invention to provide a method for making hollow articles whereby the surface of the articles is free of air occlusions and will thus remain leak-proof.

It is another object to provide a method of making hollow bodies which have a pleasant appearance and a smooth surface, which are simple and cheap to manufacture, and will allow to avoid sizable amounts of waste products from occurring during the manufacturing process.

Other objects and advantages of the method according to the invention will become apparent from the following detailed description.

The method of making articles according to the invention will now be described with reference to polyvinyl chloride resins as the plastic material to be used, but it is applicable with equally good results to a large number of other hardenable plastics.

In order to achieve the above-mentioned objects the method according to the invention can be carried out in a number of ways. According to one embodiment, into one half-mold of a shape corresponding to the hollow body to be made, a pre-shaped layer of transparent polyvinyl chloride material made by a known method, is placed, and on the inside surface of said polyvinyl chloride layer, a hardenable mass, likewise of polyvinyl chloride resin, is superposed and thereafter made to gel.

In order to obtain the layer of polyvinyl chloride which is later to be hardened, in an even thickness, it may be applied by centrifuging. Another method of application is to fill the hollow body, into which the transparent polyvinyl chloride shell has already been placed, with the polyvinyl chloride resin to be hardened and then to allow to stand until the mass becomes partly gelled, whereupon the non-gelled portion is poured off.

In another embodiment of the invention the method can be carried out by first placing the transparent shell of polyvinyl chloride material into a hollow half mold; then placing into the cavity over the shell a second mold which is so dimensioned that there will remain a certain clearance between mold and transparent shell of polyvinyl chloride. In this clearance space, a hardenable mass of polyvinyl chloride is then applied and hardened.

In each of the above described modes of procedure, the gel-forming mass of polyvinyl chloride combines intimately with the transparent polyvinyl chloride shell on the hollow mold on the outside, the hollow body will therefore have a lustrous and smooth surface, which will present a pleasant appearance. The hollow body so made has further advantages. The thin, transparent outer layer is quite dense and air-proof and it completely covers the inner mass of plastic, and small channels or air occlusions which may have formed in the hardened mass during the manufacturing process, are no longer harmful to the finished article.

It is yet another advantage that any desired pattern can be applied to the inside of the transparent layer, which pattern will then come to lie between the transparent surface layer and the hardened inside layer, which two layers will be permanently joined. The pattern is thus safely protected against wear and fading. The polyvinyl chloride material is hardened in a manner known per se in a special oven.

When such hollow bodies have been formed in a single mold, they remain in the mold when the two halves are to be combined into a whole shape. This is accomplished by pressing the two halves, each comprising a hardenable interior layer and a transparent crimped polyvinyl chloride shell superposed thereon, against each other, while hardening is brought to completion. The molds are then removed and the fully molded body is subsequently finished to eliminate the beads formed at the circumference where the two halves were joined.

If the halves of the hollow bodies are made by means of two molds, the upper or inner mold is, of course, removed before the two half bodies are joined together as described.

Generally it is desirable to provide in one of the two shaped halves a known filling stopper or air valve, before the two halves are joined by pressing or welding together.

While I have mentioned pressing together or welding the two shaped halves of hollow bodies for making the whole hollow body, it should be understood that any method could be used for joining the two halves which is known in the plastics industry, more particularly for uniting two pieces of polyvinyl chloride plastic or the like for permanent combination.

The method of the invention will now be described with reference to the accompanying drawings, but it should be understood that the illustrated embodiments are only given by way of examples and not of limitation and many changes in the details can be made without departing from the spirit of the invention.

Figure 1:
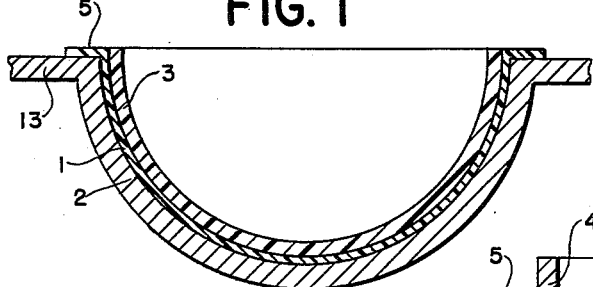
FIG. 1 illustrates the manufacture of one half of a ball with the use of a single mold.

In the method for making hollow bodies, e.g. hollow balls, one half 1 of a hollow body of the desired profile is made from a transparent polyvinyl chloride material by any known method and is then placed into a hollow mold 2 which corresponds in shape to the body 1. Mold 2 is provided with a flange 13 which is capable of engagement with a crimped portion 5 of the body 1. Then, on the inner wall of the body 1, a polyvinyl chloride mass capable of being hardened is placed, and care is taken that the mass covers the wall of hollow body 1 in a uniform layer 3.

This can be accomplished in a number of ways. For instance, the layer 3 may be produced a centrifuging process, or the space above the hollow body 1 can be filled entirely with hardenable mass. When this mass is allowed to stand and gel for a certain time it will combine with body 1, whereas the by far larger portion will not have started to gel. This portion may therefore be poured off and used for the next batch.

Figure 2:
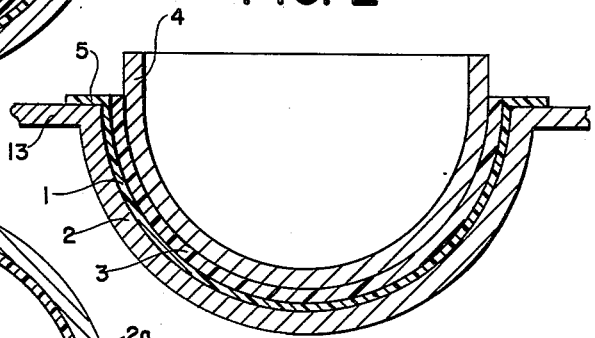
FIG. 2 shows the manufacture of half a ball with the use of an outer and an inner mold.

Another way of shaping the halves of hollow bodies according to the invention is shown in FIG. 2. Into the hollow mold 2, a preshaped half body 1 of transparent polyvinyl chloride material is placed as described with reference to FIG. 1, the crimped body portion 5 being again in engagement with flange 13, of mold 2. Then, a second mold 4, which in shape corresponds exactly to the body 1 but is so dimensioned that a clearance will be left therebetween and body 1, is placed on top of the latter and held in position (by means not shown). Subsequently, the free space between the body 1 and the mold 4 is filled with polyvinyl chloride material to be hardened. The material is then hardened in a known manner.

Figure 4:
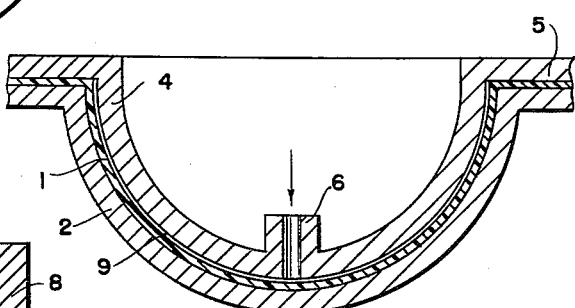
FIGS. 4 and 5 show two embodiments of the manufacture of a ball by injection molding.

In the embodiment shown in FIG. 4, a short pipe 6 is provided for filling in the polyvinyl chloride material for hardening, the pipe being permanently secured to mold 4 and having an attachment (not shown) to a source of material to be supplied.

Figure 5:
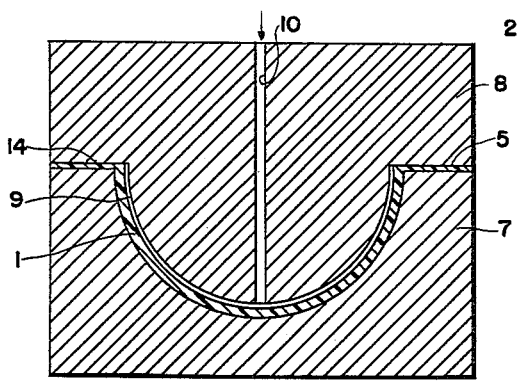

A similar arrangement is illustrated in FIG. 5. That figure shows a lower mold 7 for receiving the pre-shaped half 1 of the hollow body to be shaped. A second, correspondingly shaped upper mold 8 is placed on top of body 1 in spaced relationship thereto. The two molds 7 and 8 leave a narrow gap 14 therebetween in which the crimped portion 5 of body 1 is being received. In the upper mold 8, an admission pipe 10 is provided for the polyvinyl chloride to be hardened, through which said material flows from a source (not shown in the drawing).

If it is desired to provide the hollow bodies with a pattern, any desired design may be applied to body 1 at the inner wall thereof, before it is combined with the hardenable polyvinyl chloride and the pattern will be well protected against wear.

When two halves, made as described with reference to FIG. 1, are to be combined, they remain in the molds 2 while they are pressed together during the last stage of gel formation of layers 3 and until complete hardening has occurred. The crimped portions 5 of the two halves will form a bead during that procedure which has to be removed by cutting or grinding off to make it flush with the rest of the body.

If an inner mold 4 is used in making the half bodies, that mold has to be taken out before the two halves are combined.

Figure 3:
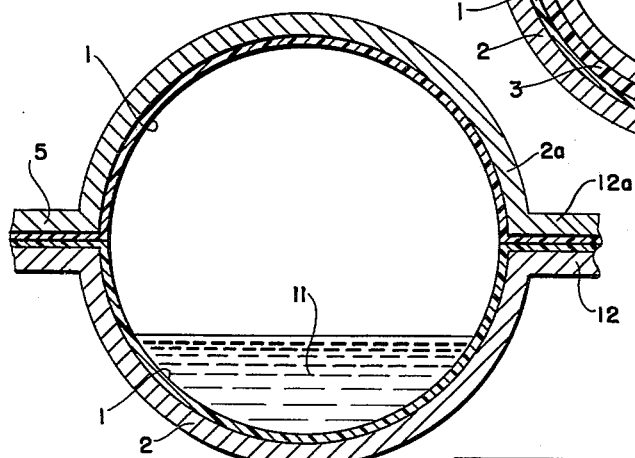
FIG. 3 illustrates the manufacture of a ball from two combined halves by a centrifuging process.

In FIG. 3 a mode of operation is illustrated by which very stable hollow bodies are made by a centrifuging process. As shown in that figure, a hollow mold 2 and a complementary mold 2a are provided, wherein mold 2 has a flange 12, and mold 2a has a flange 12a. Into each mold, a pre-shaped polyvinyl chloride body 1 and 1a, respectively, is placed. Into one of the molds, here into mold 2, an amount of polyvinyl chloride material 11 which is capable of being hardened is then placed, e.g. by pouring it in. Then, the two molds 2 and 2a with the bodies 1 and 1a inserted therein, are accurately aligned and secured in the aligned position by clamping means (not shown). Thereafter, the combined molds are placed into a centrifuge of known design where they are subjected to centrifuging until the mass to be gelled is evenly distributed. The molds are then transferred to a hardening oven where they remain until hardening is completed.

As mentioned before, it is generally advantageous to provide one of the halves of the hollow body with a stopper or valve through which the bodies may be inflated. This makes it possible to stack or ship the hollow body in collapsed form and to blow them up only before use. Saving of space may therewith be accomplished.

While in the accompanying drawings the manufacture of balls has been described by way of example, it will easily be seen that hollow bodies having other shapes can be formed and assembled in the same manner. For instance, two elliptical halves could be first shaped and then combined in the manner described. Or two cones of equal diameter, and of equal or different height can be combined. Similarly, other halves of bodies which may be combined to form hollow toys or the like, of regular or irregular shape can be made by the method according to the invention.

Instead of using polyvinyl chloride, other plastics which can be shaped in similar manner can be used, e.g. polyvinyl ester or copolymers of vinyl chloride with vinyl acetate, polystyrene, polyacrylic esters, and the like. The solid shell and the inside layer of the body may either both consist of the same plastic or they may consist of different plastics.

In the embodiments shown in the drawings the outer, transparent layer or shell of the plastic is comparatively thin, in the order of one or several millimeters, and the inner layer 3 to 5 mm. But it is easy to understand that these figures are given only by way of example and that they can be modified as required in any particular case.

What is claimed is:

1. A method for making a hollow ball elastic under impact and compression from polyvinyl chloride material, which comprises preshaping from transparent polyvinyl chloride material two solid hemispherical shells of equal diameter and of small wall thickness, placing each of said hemispherical shells into a mold of accurately conforming shape, placing within the interior of one of said hemispheres of polyvinyl chloride a further mass of polyvinyl chloride in substantially liquid state, superposing the two molds in aligned position, closing the molds and securing them against displacement, centrifuging the liquid mass to form an inner shell on the inner surfaces of the aligned solid hemispherical shells, and finally heat-treating the centrifuged mass inside the mold under conditions causing an intimate bonding of the centrifuged mass with the transparent material.

2. A method for making a hollow ball elastic under impact and compression, which comprises preshaping two solid shells, placing each of said shells into a mold of conforming shape, placing within the interior of one of said shells a mass of plastic in substantially liquid state, superimposing the two molds in a substantially aligned position, centrifuging the liquid mass to form an inner shell on the inner surfaces of the aligned preshaped shells, and heat treating the centrifuged mass under conditions causing an intimate bonding of the centrifuged inner shell with said preshaped shells.

References Cited in the file of this patent

UNITED STATES PATENTS

| 716,645 | Ransom | Dec. 23, 1902 |
| 1,865,481 | Penfold | July 5, 1932 |
| 2,313,985 | Bradshaw | Mar. 16, 1943 |
| 2,613,397 | Borkland | Oct. 14, 1952 |
| 2,839,788 | Dembiak | June 24, 1958 |
| 2,908,943 | Miller | Oct. 20, 1959 |
| 2,938,237 | Kern et al. | May 31, 1960 |
| 2,956,611 | Jendrisak et al. | Oct. 18, 1960 |

FOREIGN PATENTS

| 481,202 | Canada | Feb. 19, 1952 |
| 555,262 | Canada | Apr. 1, 1958 |
| 782,249 | Great Britain | Sept. 4, 1957 |
| 510,695 | Italy | Mar. 16, 1954 |